Dec. 5, 1967  V. O. SEEKAMP ET AL  3,356,234
CORN AUGER
Filed Feb. 28, 1966  3 Sheets-Sheet 1
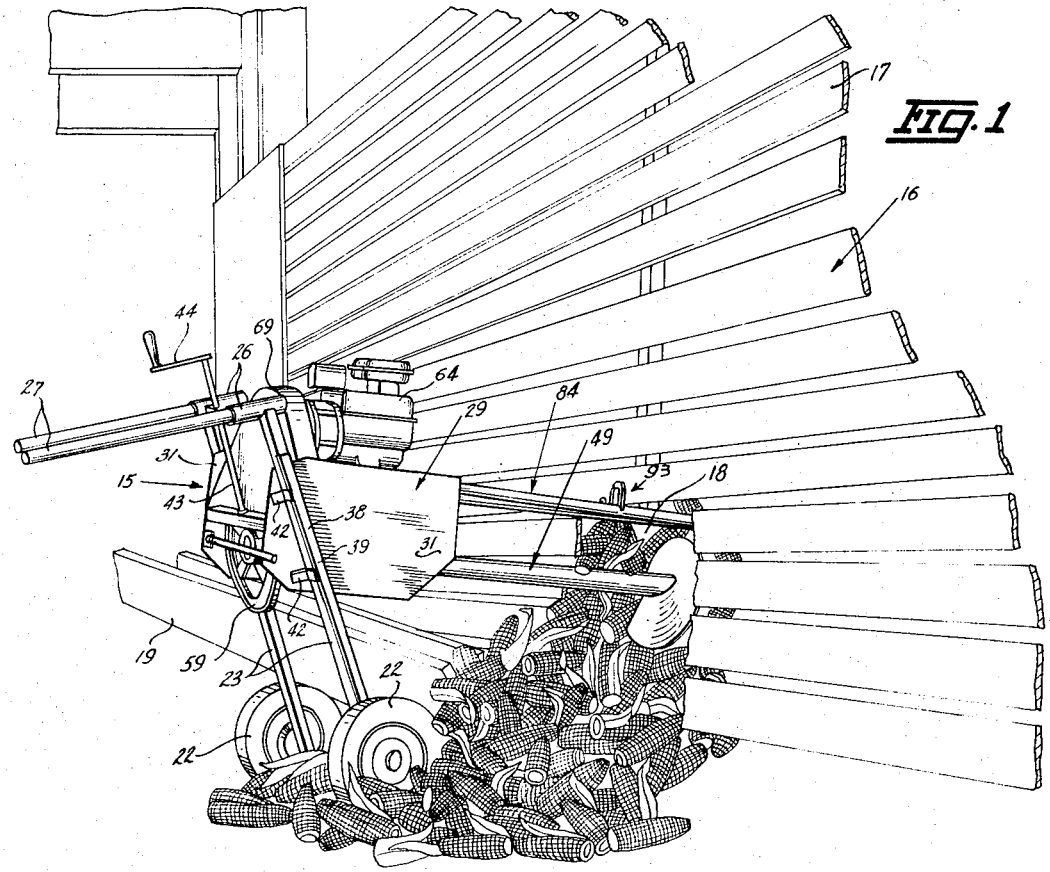
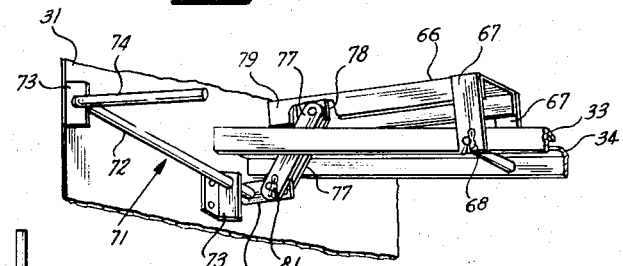
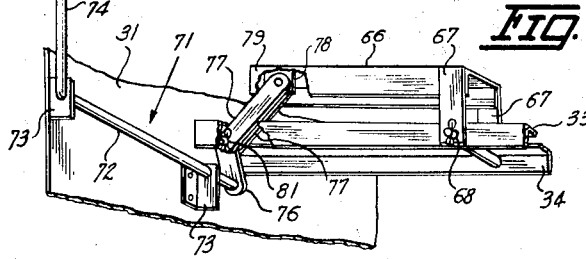
INVENTORS.
VERNON O. SEEKAMP
THOMAS W. VAN DER HART
BY *Rudolph L. Powell*
ATTORNEY.

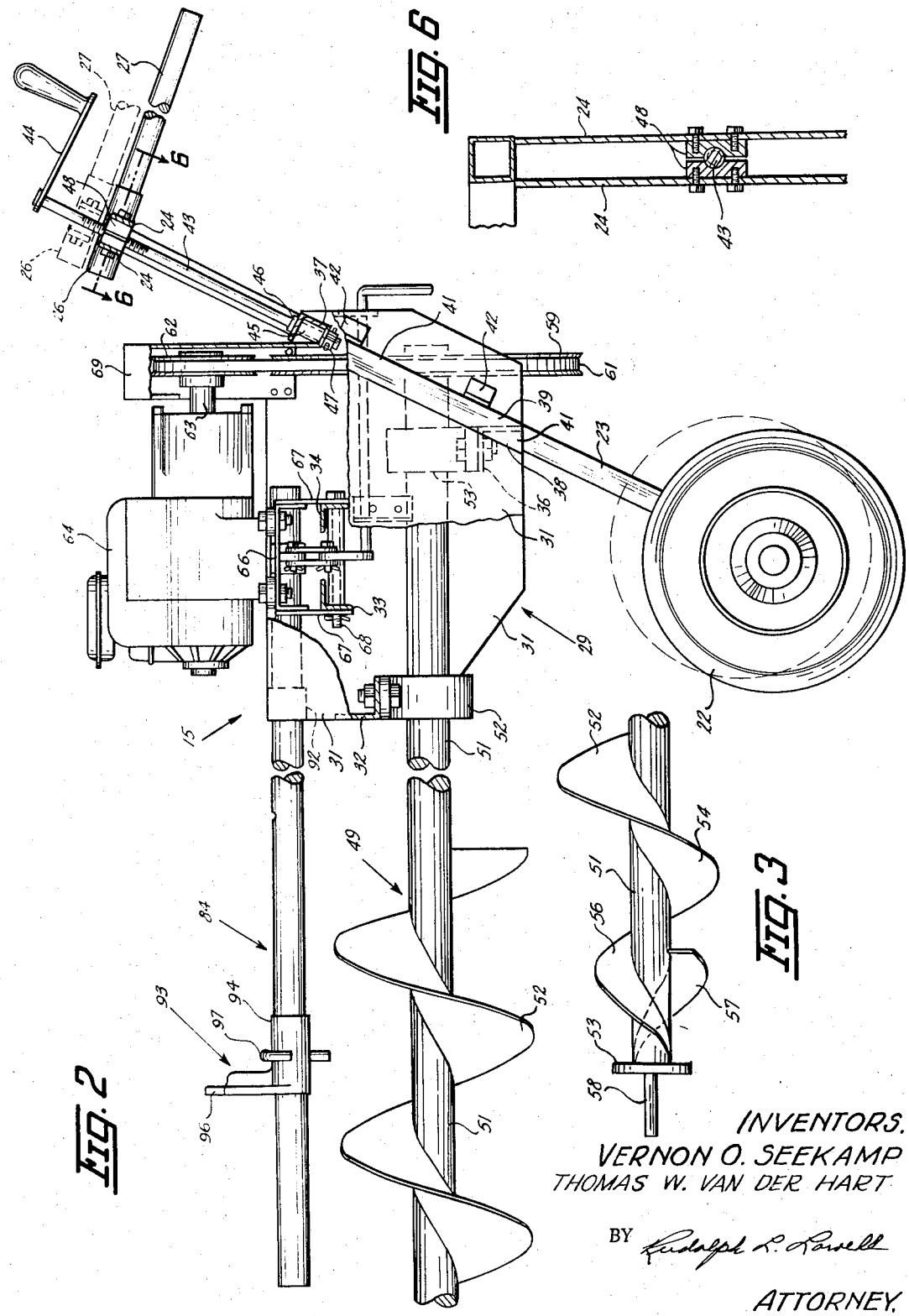

Dec. 5, 1967 V. O. SEEKAMP ET AL 3,356,234
CORN AUGER
Filed Feb. 28, 1966 3 Sheets-Sheet 3
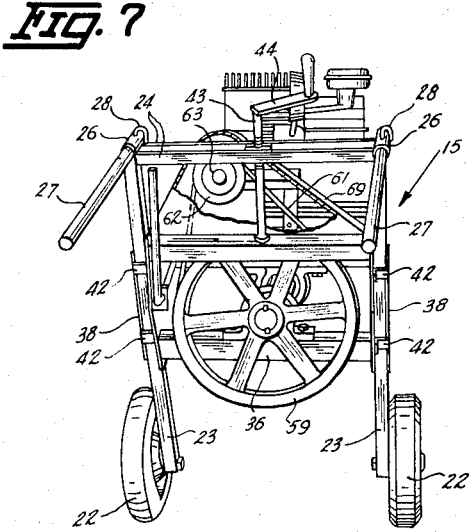
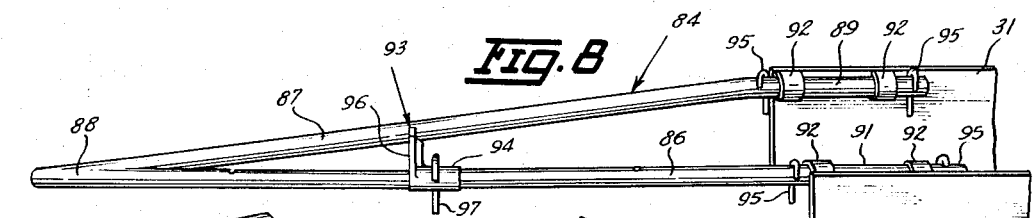
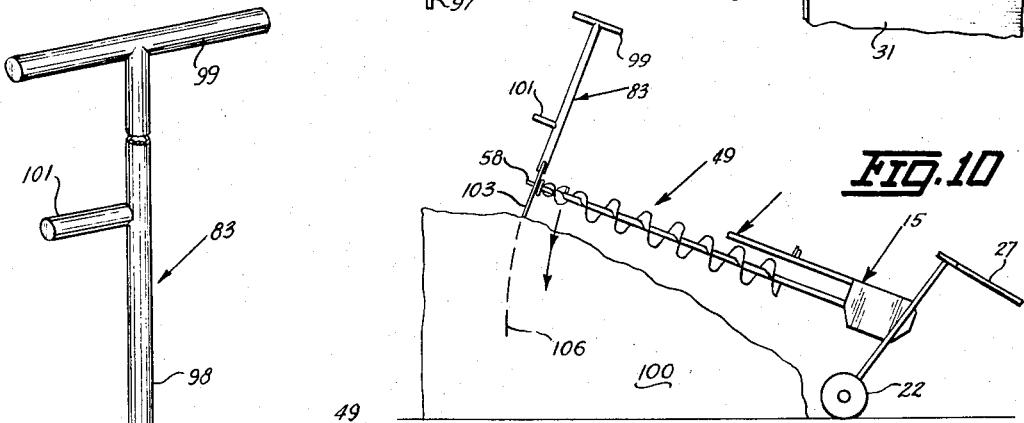
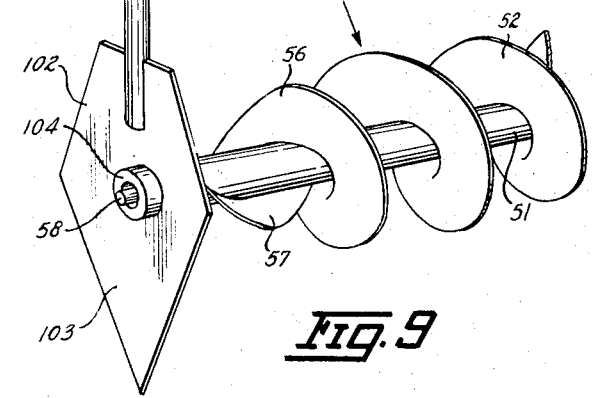
INVENTORS.
VERNON O. SEEKAMP
THOMAS W. VAN DER HART
BY *Rudolph L. Lowell*
ATTORNEY.

United States Patent Office 3,356,234
Patented Dec. 5, 1967

3,356,234
CORN AUGER
Vernon O. Seekamp, R.R. 1, and Thomas W. Van Der Hart, 1001 E. 1st St., both of Pella, Iowa 50219
Filed Feb. 28, 1966, Ser. No. 530,660
5 Claims. (Cl. 214—17)

ABSTRACT OF THE DISCLOSURE

The corn auger is of a portable type for removing corn through an opening in the side wall of a crib and includes a vertically adjustable frame carried on a two wheel and axle assembly for pivotal movement relative to such assembly. An auger has one end rotatably supported on the frame so as to extend outwardly from the frame in a direction normal to the axis of the wheel and axle assembly. The auger is driven by a frame mounted power unit. Secured to the frame and projected outwardly therefrom in a spaced relation with the auger is an arm structure that carries a longitudinally adjustable stop member. On insertion of the auger within the crib side wall opening, the penetration of the auger within the crib resulting from the screw action of the auger relative to the corn in the crib, is limited or controlled by the engagement of the stop member with the crib side wall.

---

This invention relates generally to apparatus for unloading or removing material such as ear corn or the like from a stored quantity of the material and in particular to a portable power driven screw conveyer for removing ear corn from a crib or from a pile of ear corn.

An object of this invention is to provide an improved apparatus for removing ear corn from a crib.

A further object of this invention is to provide a portable apparatus wherein an outwardly projected screw conveyor for removing ear corn from a crib is insertable within an opening in the side wall of the crib and limited as to its penetration within the crib during a corn removal operation.

Another object of this invention is to provide an apparatus for removing ear corn from a crib in which a mounting frame for supporting a projected screw conveyer is supported for up and down movement and for tiltable movement longitudinally of the conveyer to provide for the insertion of the conveyer into a side wall opening of the crib and wherein the mounting frame carries a control arm structure engageable with the side wall to limit or control the penetration of the screw conveyer within the crib during a corn removal operation.

A further object of this invention is to provide a self-powered portable apparatus for removing corn from a crib or from a piled quantity thereof that is capable of being moved and operated by one man and wherein a corn removing screw conveyer is supported for up and down longitudinal tilting movements in operative association with a control structure which limits the penetration of the screw conveyer into the corn during a corn removal operation.

Still another object of this invention is to provide a screw conveyer apparatus for removing corn from a crib which is easily handled by one man, light in weight, economical in cost and efficient in operation to quickly unload corn from a crib.

Further objects, features and advantages of this invention will become apparent from the following description when taken in connection with the accompanying drawing in which:

FIG. 1 is a perspective view of the apparatus of this invention illustrating its operation relative to a corn crib;

FIG. 2 is an enlarged foreshortened side view of the apparatus with some parts broken away and other parts shown in section to more clearly illustrate its construction;

FIG. 3 is a detail side elevational view of the free or front end portion of the screw conveyer;

FIGS. 4 and 5 are perspective detail views of a clutch mechanism for controlling the operation of the screw conveyer, showing the clutch mechanism in changed positions therefor;

FIG. 6 is an enlarged sectional detail view as seen on the line 6—6 of FIG. 2;

FIG. 7 is a perspective view of the apparatus as seen from the rear end thereof;

FIG. 8 is a perspective view of the control arm structure for limiting the penetration of the screw conveyer into the corn being unloaded;

FIG. 9 is a perspective view of a stake device shown in assembly relation with the front end of the screw conveyer and used when the apparatus is to be operated to remove material from a piled quantity of the material; and FIG. 10 is a diagrammatic illustration showing the use of the stake device shown in FIG. 9.

Referring to the drawing the material unloading apparatus of this invention, indicated generally at 15, is shown in FIG. 1 in operative relation with a corn crib 16 having a slotted side wall 17 formed with an opening 18. Extended longitudinally of the crib 16 and to the outside thereof below the opening 18 is a conveyer 19 for delivering ear corn discharged from the opening to a corn sheller of the like (not shown).

The apparatus 15 includes a portable frame having a wheel and axle assembly comprised of a pair of ground wheels 22 rotatably supported at the lower ends of a pair of corresponding upright tubular bar members 23 of a square shape in transverse section. The upper ends of the bar members 23 are connected together by a pair of transverse brace or strap member 24 arranged in upright planes and in a parallel spaced relation as best appears in FIGS. 2 and 6. Secured to the upper end of each bar member 23 and above the brace members 24 is a longitudinally extended sleeve section 26 (FIGS. 1 and 7) for receiving in a guidable relation the inner or forward ends of handle bar members 27. A hooked pin 28 is extendible through registering holes in an associated handle 27 and sleeve section 26 to releasably secure a handle to a sleeve section.

Adjustably supported for up and down movement on the bar members 23 is a mounting frame indicated generally at 29 in FIGS. 1 and 2. This mounting frame 29 includes a pair of upright side plates 31 transversely spaced a distance apart corresponding to the transverse spacing between the upright bar members 23. The side plates 31 are of an irregular contour but of a generally rectangular shape and are rigidly secured together by a plurality of transversely extended brace members 32, 33, 34, 36 and 37 of an angle iron construction as best appears in FIG. 2.

For guidably supporting the mounting frame 29 for up and down movement on the bar members 23 there is provided a pair of transversely opposite guide units 38 (FIGS. 1 and 7) each of which is secured to the outer surface of a corresponding side plate 31. Each side unit 38 has an upright angle member 39 of a size to receive a corresponding bar 23 in a mating relation therein. An angle member 39 has a forward transversely extended leg attachment along its free end, as by welding, to a corresponding side plate 31 and a longitudinally extended leg 41 projected rearwardly in a parallel spaced relation with a side plate 31.

The slidable support of a bar member 23 within an angle member 39 is retained by a pair of holding lugs 42 (FIGS. 2 and 7) spaced longitudinally of an angle member 39 and secured to a side plate 31 and to the rear end of the angle member leg 41 in a parallel relation with the transverse forward leg of the angle member. A guide unit 38 is thus formed by an angle member 39, lugs 42 and a side plate 31 and is of a square shape in transverse section so as to slidably receive a bar member 23 in a guiding relation therein.

Adjustment of the mounting frame 29 to an adjusted position relative to the bar members 23 is accomplished by means including an upright screw shaft 43 actuated by a crank handle 44 which is accessible at the rear end of the mounting frame 29 (FIGS. 2 and 7). The lower end of the screw 43 is rotatable in a bearing 45 (FIG. 2) formed in the transverse brace member 37 which is carried between the upper rear ends of the side plates 31. The screw 43 is held against axial movement relative to the brace member 37 by a collar 46 secured to the screw 43 above the bearing 45 and a collar 47 releasably secured to the screw 43 below the bearing 45.

The upper section of the screw is threaded for cooperative engagement with a split nut 48 (FIGS. 2 and 6) attached to and supported between the strap members 24 which are connected to the upper ends of the bar members 23. On manipulation of the crank handle 44 the mounting frame 29 is moved up and down relative to the bar members 23 and is held in an adjusted position by virtue of its support from the strap members 24 through the screw 43.

The adjustable up and down movement of the mounting frame 29 in turn provides for the up and down adjustment of a screw conveyor or auger 49 (FIG. 2) which projects longitudinally from the forward end of the mounting frame. The rear end of the auger shaft 51 is rotatably supported in bearings 52 and 53 carried on the transverse brace members 32 and 36, respectively. As best appears in FIG. 2 the brace members 32 and 36 are spaced longitudinally of the mounting frame 29 between the side plates 31, with the front bearing 52 depending from the brace member 32 and the rear bearing 53 being supported on the top side of the brace member 36.

The auger flight 52 extends from a position forwardly of the mounting frame 29 to a stop collar or flange 53 (FIG. 3) mounted on the front or leading end of the auger shaft 51. The foremost complete helix 54 of the auger flight 52 has a front tapered section 56 extended over about half the length or pitch thereof. The section 56 is tapered in an inward and forward direction with its terminal end adjacent to and substantially within the peripheral confines of the stop collar 53. Arranged on the auger shaft 51 oppositely from the tapered section 56 is a correspondingly tapered flight portion 57 the rear end of which terminates in a radius equal to the radius of the auger flight 52. A stub shaft section 58 of a reduced diameter projects forwardly from the collar 53 for a purpose to appear later.

Mounted on the auger shaft 51 for rotation therewith and at a position rearwardly of the rear bearing 53 and between the side plates 31 is a driven pulley 59 (FIGS. 2 and 7) which is connected by a belt 61 with a drive pulley 62 carried on the drive shaft 63 of a power unit or engine 64 illustrated as being of air cooled type. As shown in FIG. 2 the engine 64 is attached to a pivoted base plate 66 of a channel construction positioned transversely of the mounting frame 29 between the side plates 31.

A pair of oppositely arranged depending legs 67 (FIGS. 2, 4 and 5) at one end of the base plate 66 have their free or lower ends pivoted at 68 on a pin carried in the transverse brace members 33 and 34 which are spaced longitudinally of the mounting frame 29 in a parallel relation. Pivoted movement of the base plate 66 relative to the pivot 68 functions as a clutch means to move the engine drive pulley 62 into and out of frictional driving engagement with the belt 61. A hood or guard 69 for shielding the pulley 62 is provided on the inner surface thereof with belt retaining members (not shown) for retaining the belt loosely about the pulleys 59 and 62 when the base plate 66 is in its downwardly moved position shown in FIG. 4 corresponding to a declutching or uncoupling position of the belt 61 relative to the pulleys 59 and 62.

The base plate 66 is pivotally moved or operated by an actuating structure 71 (FIGS. 4 and 5) which includes a rock shaft 72 rotatably supported in brackets 73 secured to the inner surface of the side plate 31 remote from the pivot 68. The rear end of the rock shaft 72 has a lateral extension 74 located at the rear end of the mounting frame 29 and constituting a manually operable lever. A rock arm 76 at the forward end of the rock shaft 72 is pivotally connected at 81 to one of the ends of a pair of links 77, the opposite ends of which are pivotally connected to a lug 78 depended from the base plate 66 adjacent the end 79 remote from the pivot 68. As clearly appears in FIGS. 4 and 5 the links are arranged in a straddling relation with both the rock arm 76 and the lug 78.

The base plate 66 is illustrated in FIG. 4 in its lowered position providing for the uncoupling of the belt 61 from connecting engagement with the pulleys 59 and 62 whereby to stop rotation of the screw conveyer 49. This disconnect or uncoupling condition of the belt 61 is defined by the abutting engagement of the end 79 of the base plate 66 with the transverse brace members 33 and 34.

FIG. 5 shows the base plate 66 in its pivotally raised position relative to the pivot 68 to provide for the coupled or connected assembly of the belt 61 with the pulleys 59 and 62. As clearly appears in FIG. 5 the actuating handle 74 and rock arm 76 are angularly offset relative to the axis of the rock shaft 72. Thus when the lever 74 is in a vertically upright position the rock shaft 76 is offset therefrom in a direction away from the pivot 68. The rock shaft 76 and links 77 thus function as toggle links to provide for the location of the connecting pivot 81 therebetween being moved to a position for locking the rock shaft and toggle links against relative pivotal movement whereby to hold the base plate 66 in its upwardly moved position shown in FIG. 5.

As thus far described it is seen that the operation of the screw conveyer 49 from the engine 64 is controlled by the manipulation of the actuating lever 74 and that up and down movement of the screw conveyer in a substantially horizontal position is accomplished by manipulation of the crank 44 which raises and lowers the mounting frame 29 relative to the upright bar members 23. Referring to FIG. 7 it is seen that both the actuating lever 74 and crank handle 44 are conveniently located to the rear of the mounting frame 29 and between the handle bars 27 so as to be readily accessible to an operator. Additionally by virtue of the support of the mounting frame 29 on the upright bar members 23 it is seen that the screw conveyer 49 is tiltable in a longitudinally extended direction by merely depressing or raising the handle bars 27 to pivot the upright bars 23 relative to the axes of the ground wheels 22.

In the use of the apparatus 15 of this invention to unload ear corn from the crib 16 the opening 18 in the crib side wall 17 is formed of a size to receive the auger 49. With the engine 64 in operation and with the auger 49 idle the mounting frame 29 is adjusted relative to the bar members 23 and the auger longitudinally tilted to provide for the insertion of the auger axially through the opening 18. The clutch lever 74 is then actuated to operate the auger 49 after which the apparatus 15 is moved toward the crib by pushing forwardly on the handle bars 27.

The pair of oppositely arranged tapered flight sections 56 and 57 provide for the auger 49 being initially centered within the ear corn, shown at 82, whereby to facilitate the entrance of the auger into the corn. Stated otherwise the tapered sections 56 and 57 have little conveying action and function as an enlarged tapered double thread to worm or thread themselves into the corn. As a result the auger 49 is easily started into the corn without breaking or chopping the ear corn.

Following this initial centering action of the tapered flight sections 56 and 57 and on a continued insertion of the auger 49 into the opening 18 the auger flight 52 takes over to convey corn from the crib 16 for discharge into the conveyer 19. This conveying action will continue for the full insertion of the auger into the crib and until after the corn stored above the inserted auger and dropping therein by the action of gravity has been removed. It is thus apparent that an appreciable quantity of corn is capable of being unloaded by a single insertion of the auger 49 into the crib. As a result a minimum number of auger insertions need be made in order to empty the crib.

After the entrance of the auger 49 into the corn has been initiated the auger flight 52 tends to function as a screw relative to the stored corn so as to propel or draw the apparatus 15 toward the crib 16. A counter-restraining action must be exerted, therefore, by the operator to control the extent of penetration of the auger within the corn. To eliminate this inconvenience to the operator and to definitely control the extent of penetration of the auger 49 into the corn there is provided a control arm structure indicated generally at 84 (FIGS. 1, 2 and 8).

As best appears in FIG. 8 the structure 84 is comprised of a pair of tubular arms 86 and 87 projected forwardly from the mounting frame 29. The member 86 is linearly extended with the member 87 inclined relative thereto, so that the forward ends of the members 86 and 87 may be secured together to form an apex 88 of a cross sectional area equal substantially to the cross sectional area of either of the members 86 or 87. The rear end section 89 of the member 87 is extended in a spaced parallel relation with the member 86 and with this spacing being substantially equal to the transverse spacing between the side plates 31 of the mounting frame 29. The rear section 89 of the member 87 and the rear section 91 of the member 86 are carried within corresponding pairs of ring supports 92 secured in a longitudinally spaced relation to the inner sides of the side plates 31 at positions adjacent the top of the plates 31.

In assembly, therefore, the rear end sections 89 and 91 are merely inserted within corresponding ring members 92. Hooked pins 95 inserted through the sections 89 and 91 limit the longitudinal movement of the control arm structure 84 relative to the ring supports 92.

Adjustably supported on the arm member 86 for movement longitudinally thereof is a stop member 93 comprised of a sleeve member 94, slidable on the arm member 86, and a laterally extended stop or abutment member 96. A hooked pin 97 is insertable through registering openings in the sleeve 94 and in the arm member 86 to hold the stop member 93 in a longitudinally adjusted position.

Thus as best appears in FIG. 1 concurrently with the insertion of the auger 49 through the crib wall opening 18 the control arm structure 84 is concurrently inserted through the opening 18 at a spaced position above the auger 49. The auger will thus feed or screw itself into the corn 82 a distance limited by the engagement of the stop member 93 with the crib side wall 17. By virtue of this limiting action the load on the auger 49 is controlled by regulating the extent of its penetration into the stored corn. Additionally the apparatus 15 will remain stationary, on engagement of the stop member 93 with the crib side wall, so as to completely eliminate the necessity of the operator holding back on the apparatus. The control arm structure 84 thus provides for successively greater penetration of the auger 49 within the crib while permitting freedom of the operator to work elsewhere while the corn is being removed.

In those instances where the ear corn is merely stored in a piled up condition on the ground the stake device indicated generally at 83 in FIG. 9 is used in lieu of the control arm structure 84 of FIG. 8 to control the penetration of the auger 49 into the corn. The stake device 83 includes an upright tubular support 98 integrally formed at its upper end with a T-handle 99 and a laterally extended foot engaging member 101 adjacent its lower end. Secured to the lower end of the support 98 and extended linearly downwardly therefrom is a flat inserting plate 102 having a spear shaped lower section 103. A bearing 104 positioned centrally of the plate member 102 is adapted to rotatably receive the reduced shaft section 58 of the auger shaft 51.

With the stake device 83 positioned on the shaft section 58 and against the collar 53 the apparatus 15, as shown in FIG. 10, is moved adjacent a pile of ear corn 100 with the auger 49 extended over the corn. The spear 103 is then pushed into the corn by the operator pressing downwardly with his foot on the member 101. On operation of the auger 49 and by progressively tilting the auger in a downward and forward direction ear corn 100 is removed from the pile as the auger advances downwardly therethrough in a pivoted arc indicated at 106. During this pivotal movement screwing of the auger 49 into the pile of corn is prevented by the anchoring action of the stake device 83 in the corn 100.

It is seen therefore that the apparatus 15 is readily adapted for the unloading of corn from a crib or the like 16 or from a piled quantity of material with a minimum of attention from the operator therefor.

Although the invention has been described with respect to a preferred embodiment thereof it is to be understood that it is not to be so limited since changes and modifications can be made therein within the full intended scope of this invention as defined by the appended claims.

We claim:

1. Apparatus for removing a bulk material from a container through an opening in the side wall of the container comprising:
    (a) a portable frame,
    (b) an auger rotatably supported on and projected outwardly from one end of said frame,
    (c) a power unit on said frame for driving said auger,
    (d) an elongated control arm structure projected outwardly from said one end of the frame in a substantially parallel relation with the axis of said auger, and
    (e) a laterally extended stop means adjustably supported on said control arm structure for movement longitudinally thereof to an adjusted position,
    (f) said auger and control arm structure being extendible within the container through said opening a distance limited by the engagement of said stop means with said container side wall.

2. Apparatus for removing a bulk material from a container through an opening in the side wall of the container comprising:
    (a) an elongated auger,
    (b) a frame means for rotatably supporting the auger at one end thereof,
    (c) means for adjustably supporting said frame means for up and down movement and for tiltable movement in a direction extended longitudinally of said auger,
    (d) a control arm structure carried on said frame means and projected in the direction of said auger in a spaced relation therewith, and
    (e) a laterally extended stop means on said control arm structure,
    (f) said auger and control structure being extendible within the container through said opening a distance limited by the engagement of said stop means with said container side wall.

3. Apparatus for removing a bulk material from a container through an opening in the side wall of the container comprising:
(a) a mounting frame,
(b) an auger rotatably supported at one end thereof on said mounting frame,
(c) an arm structure mounted on said mounting frame and extended outwardly therefrom in the direction of and in a spaced relation with said auger, and
(d) a laterally extended stop means adjustably supported on said arm structure to longitudinally adjusted positions thereon,
(e) said auger and arm structure being extendible within the container through said opening a distance limited by the engagement of said stop means with said container side wall.

4. The apparatus according to claim 3 including:
(a) means supporting said mounting frame for up and down movement and for tilting movement longitudinally of said auger.

5. The apparatus according to claim 3 including:
(a) a wheel and axle assembly having a pair of transversely spaced upright bar members, and
(b) means guidably supporting said mounting frame on said upright bar members for adjustable up and down movement.

References Cited

UNITED STATES PATENTS

| | | | |
|---|---|---|---|
| 1,324,145 | 12/1919 | Davidson | 198—213 |
| 1,434,946 | 11/1922 | Fiorillo | 77—34.5 |
| 2,058,125 | 10/1936 | Bean | 214—17 |
| 2,298,332 | 10/1942 | Applegate | 214—17.8 XR |
| 2,430,327 | 11/1947 | Clites | 214—17.8 XR |
| 2,601,049 | 6/1952 | Neighbour | 214—17.8 |
| 2,607,472 | 8/1952 | Senstock | 198—233 |
| 2,708,504 | 5/1955 | Puzey | 198—233 XR |
| 2,799,407 | 7/1957 | Vanier et al. | 214—17.8 |

ROBERT G. SHERIDAN, *Primary Examiner.*